Oct. 13, 1970   B. E. BUEHLER   3,534,238
BASE METAL ELECTRODE CAPACITOR
Filed March 11, 1968   5 Sheets-Sheet 1

INVENTOR.
BERT E. BUEHLER
BY
Hopgood & Calimafde
ATTORNEYS

INVENTOR.
BERT E. BUEHLER
BY
Hopgood & Calimafde
ATTORNEYS

United States Patent Office 3,534,238
Patented Oct. 13, 1970

3,534,238
BASE METAL ELECTRODE CAPACITOR
Bert E. Buehler, Chatham, N.J., assignor to Nytronics, Inc., Berkeley Heights, N.J., a corporation of New Jersey
Filed Mar. 11, 1968, Ser. No. 712,227
Int. Cl. H01g 1/01
U.S. Cl. 317—258           3 Claims

ABSTRACT OF THE DISCLOSURE

A base metal electrode capacitor is provided comprising a dielectric of barium titanate containing about 15% to 25% of $MnO_2$, 0.5% to 2% $Fe_2O_3$ and 0.1% to 1% $CeO_2$. Between thin layers of the dielectric are interleaved deposited films of a base metal electrode, such as Ni, Co, Fe and alloys thereof, the edges of alternate films of the electrode being mechanically and electrically joined, the stacked layers being then fired under inert conditions, e.g. a nitrogen atmosphere, at an elevated temperature, e.g. at least about 1280° C.

---

The high permittivity of barium titanate has made possible a marked reduction in size of capacitors. Capacitors using this type of dielectric material are used extensively in electronic applications where it is desired to conserve both weight and space. Examples of such applications are guided missiles, ballistic missiles, satellites, and the like.

In order to take full advantage of the reduction in size occasioned by the use of high permittivity ceramics, e.g. barium titanate, it is desirable to shape the dielectric into the form of thin sheets. Barium titanate, when fired in single sheet form, is usually electroded with silver, this being accomplished in a second firing at a relatively low temperature following the initial firing of the barium titanate at relatively high temperature. The two firings cannot be accomplished simultaneously since the silver cannot withstand the much higher barium titanate firing temperature. Silver is the only noble metal cheap enough to make simultaneous sintering of electrodes and dielectric economic, but to use it in this way would necessitate developing a high permittivity dielectric sintering technique below 900° C. which to date has not been done.

The production of monolithic capacitors (that is multi-layered capacitors) presents a different problem in that stacked layers of the dielectric are interleaved with thin films of electrode material such that the electrode films are within the dielectric, necessitating the simultaneous firing of both ceramic and electrode. The whole assemblage is then subjected to a high temperature firing. Silver cannot be used in this way. The only known alternative is to use high melting point precious metals such as platinum, palladium, and the like, as these metals can withstand temperatures as high as 1300° C. and higher and resist oxidation. However, using these metals render the capacitors more expensive.

It would be desirable to use base metal electrodes, such as nickel, cobalt, iron, and alloys thereof, which are capable of withstanding firing temperatures substantially in excess of 900° C. However, a disadvantage of the base metal, other things being equal, is that during firing, the base metal electrode reacts with barium titanate and becomes oxidized at the surface, whereby both the dielectric and the base metal electrode are rendered useless.

I have now found that I can provide a base metal electrode capacitor having desirable electrical properties, provided steps are taken to modify the barium titanate by adding to it a novel combination of substances over a controlled range of composition.

It is thus the object of this invention to provide a method for producing a base metal electrode capacitor.

Another object is to provide a base metal electrode capacitor characterized by an improved combination of electrical properties.

A still further object is to provide a base metal electrode capacitor in which the dielectric is substantially barium titanate containing controlled amounts of manganese dioxide, iron oxide and cerium oxide.

These and other objects will more clearly appear when taken in junction with the following description and the accompanying drawings, wherein.

Figure 1:
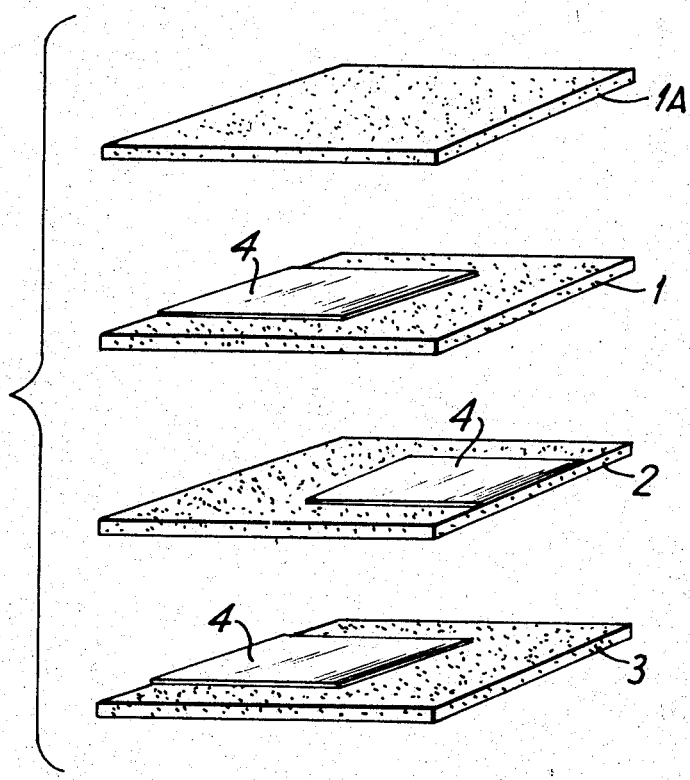
FIG. 1 is an exploded view showing thin layers of ceramic, each containing a base metal electrode film.

As stated hereinbefore, one of the advantages of using barium titanate as a dielectric is that, because of its high permittivity, it can be employed in the form of very thin sheets. A known process comprises dispersing ceramic particles of the dielectric in an organic vehicle sufficient to form a film on, for example, a flat plate of glass, such that on drying, the film is strong enough to be pealed off and cut into pieces of convenient size. Each of the pieces are then painted with an organic dispersion of electrode metal particles, the areas painted being staggered from piece to piece so that when the painted layers are dried and stacked, alternate layers of the electrode film will extend from one edge of the stack, while the remaining alternate layers will extend from the opposite edge of the stack (note FIG. 1). The stacks are then fired at a temperature, for example, of about 1300° C.

In carrying out the invention, I employ at least 72% by weight of barium titanate as the ceramic together with about 15% to 25% $MnO_2$, about 0.5% to 2% $Fe_2O_3$ and 0.1% to 1% $CeO_2$. A more narrow range found advantageous is one containing about 18% to 20% $MnO_2$, about 0.5% to 1% by weight of $Fe_2O_3$, about 0.1% to 0.5% by weight of $CeO_2$ and the balance at least about 78% by weight of barium titanate ($BaTiO_3$). A composition found to have particularly useful electrical properties is one containing about 79% $BaTiO_3$, about 19.8% $MnO_2$, about 1% $Fe_2O_3$ and about 0.2% $CeO_2$.

In a preferred embodiment, the following ingredients are mixed together: about 79% by weight of $BaTiO_3$, about 19.8% by weight of $MnO_2$, about 1% $Fe_2O_3$ and about 0.2% $CeO_2$. The composition is initially mixed in ethylene dichloride for about 12 hours, dried and then calcined in air for two hours at 1100° C. After cooling, the calcined material is remixed in the same liquid for a period of about 8 hours and then dried again. After the second drying, the material is mixed with an organic binder of acryloid plastic dispersed in ethylene dichloride, the binder comprising about 45% by weight of the total mixture. Thereafter, the mixture is formed into a thin sheet. Individual pieces are punched out and a thin film of electrode nickel applied to each of the pieces. The nickel is applied as a slurry of carbonyl nickel powder dispersed through a carrier of ethyl cellulose in terpineol. After drying, the filmed pieces are stacked one on top of the other to form a capacitor assembly. Opposite edges of the stack (note FIG. 2) are provided with a thin film of the same metal as the electrode, e.g. nickel powder applied as a slurry to provide electrode connection. The assembly is then sintered in an inert atmosphere, such as nitrogen, at a temperature of about 1300° C., for about 1 hour. Thus, electrode connection is achieved simultaneously with the high temperature sintering of the assembly.

An advantage of using nickel cobalt, and the like base metal for electrode connection is that the metal is didirectly solderable, thus alleviating the need for applying silver to the edge electrode in a second firing. In the case of a platinum metal electroded capacitor, a second firing is necessary since platinum cannot be soldered to directly.

Referring to FIG. 1, an exploded array of a capacitor assembly is shown comprising ceramic layers 1A, 1, 2 and 3, each having applied to the surface thereof a film of electrode nickel 4 as shown. Layer 1A is a cover plate and along with layer 3 essentially seals off the internal electrodes.

Figure 2:
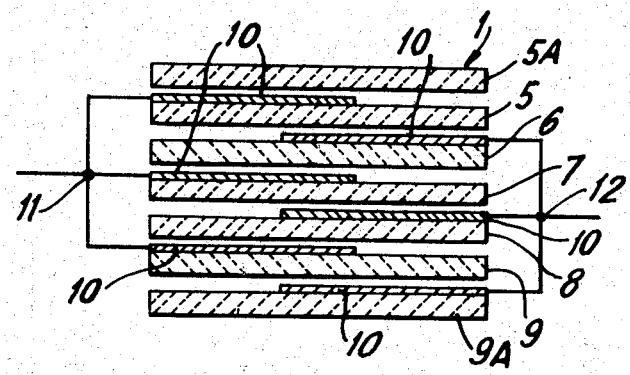
FIG. 2 is a schematic representation in cross section of layers of ceramic interleaved with films of base metal electrode.

In FIG. 2 a completed capacitor is shown comprising ceramic layers 5A, 5, 6, 7, 8, 9 and 9A, having interleaved therebetween a plurality of electrode films 10 of a metal from the group nickel, cobalt, iron and alloys thereof, the metal in this instance advantageously being nickel. As will be noted, alternate layers or films of nickel are electrically coupled together at 11 on the one hand, while the remaining alternate layers of the electrode metal are coupled at 12 on the other hand.

Figure 3:
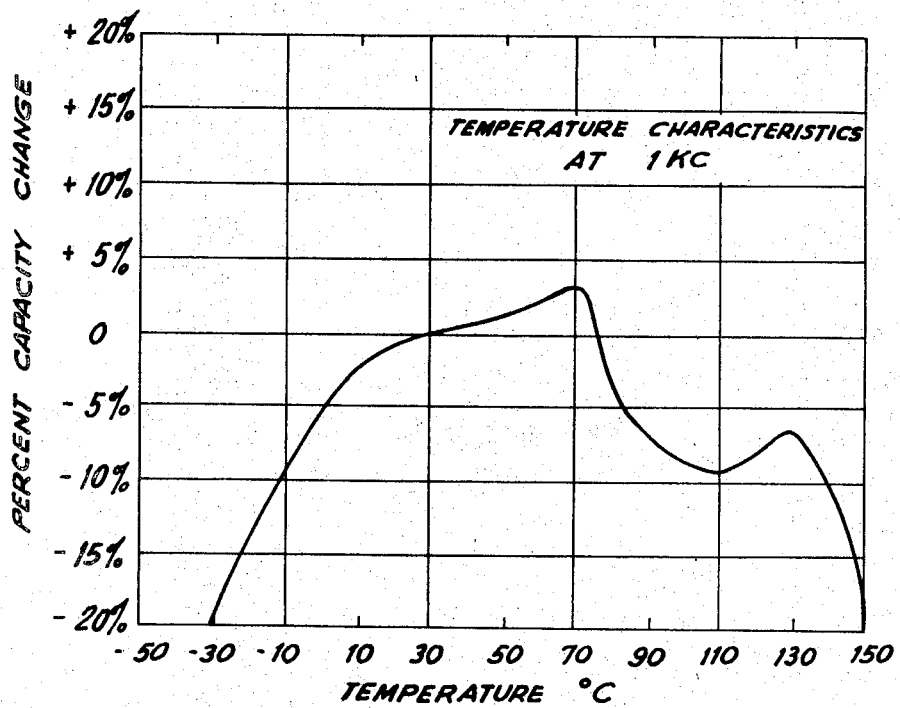
FIGS. 3 and 4 are graphs showing, respectively, the change in percent capacity and dissipation factor as a function of temperature.
Figure 4:
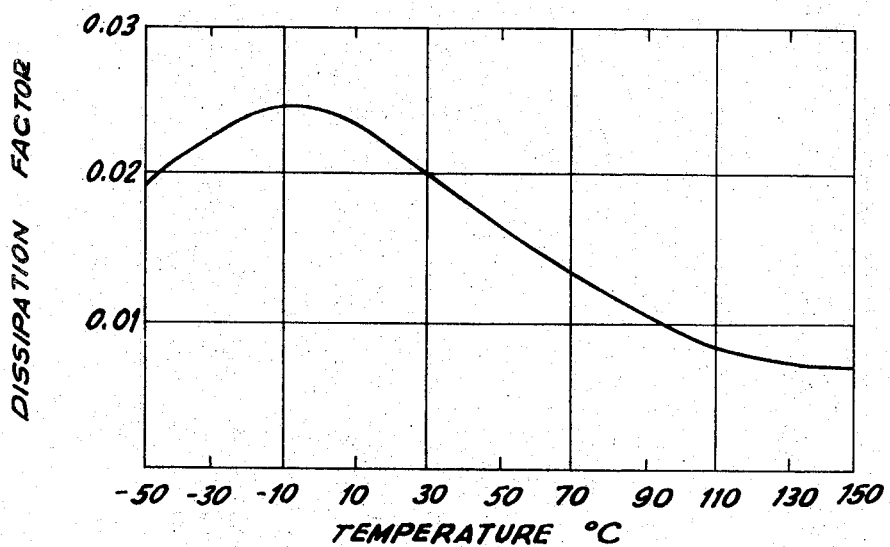

In working with a preferred embodiment of the invention, very desirable electrical properties are obtained. The base metal electrode capacitor exhibits properties comparable to and in some instances better than prior barium titanate capacitors using platinum as the electrode metal. The capacitor of the invention (approx. 79% $BaTiO_3$, approx. 19.8% $MnO_2$, approx. 1% $Fe_2O_3$ and approx. 0.2% $CeO_2$) possesses a K of about 1200 at about room temperature which is retained at a variation of about ±15% over the temperature range of about −20° to almost 150° C. or ±20% from about −50° to 150° C. as shown in FIG. 3. The dissipation factor (note FIG. 4) is maintained over a relatively narrow range of about 0.008 to about 0.025 as compared to a prior platinum electrode capacitor with $BaTiO_3$ alone which exhibited a dissipation factor over the broader range of about 0.006 to as high as 0.036.

Figure 6:
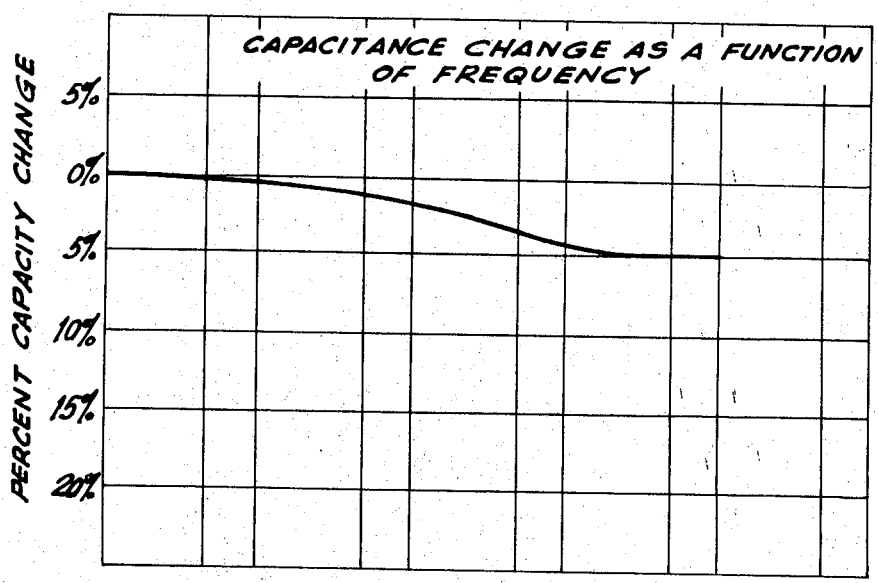
FIGS. 6 and 7 are graphs showing, respectively, change in capacitance and dissipation factor with change in frequency.

Moreover, capacitance change as a function of frequency is improved (note FIG. 6), the change in capacitance ranging from about 0 to 5% over a frequency range of 1 kc. to 10 mc. as compared to the same prior platinum electrode capacitor which exhibited a percent change in capacitance ranging from over a broader range of about 0 to over 15% for the same range of frequencies.

Figure 7:
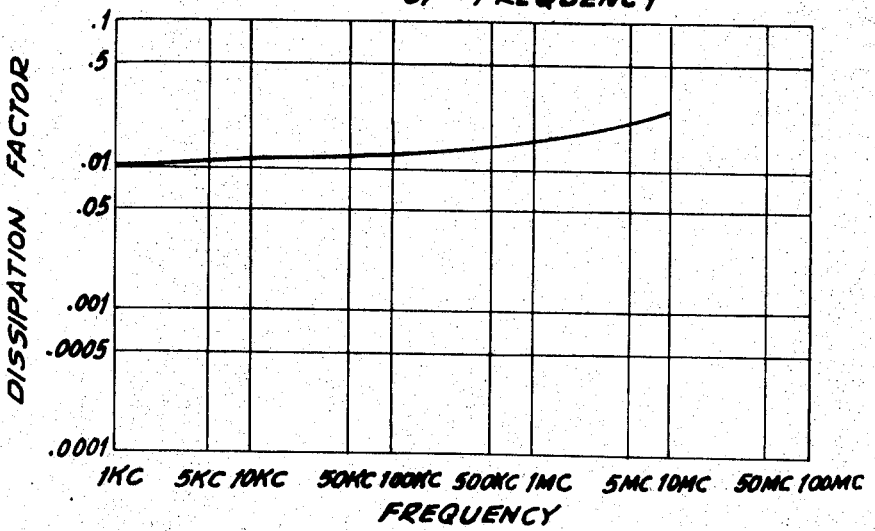

Referring to FIG. 7, it will be noted that the dissipation loss as a function of frequency ranging from 1 kc. to 10 mc. is restricted to a relatively narrow range of 0.01 to 0.025 as compared to the prior platinum electrode capacitor in which the dissipation factor ranged broadly from about 0.008 to 0.06.

Figure 8:
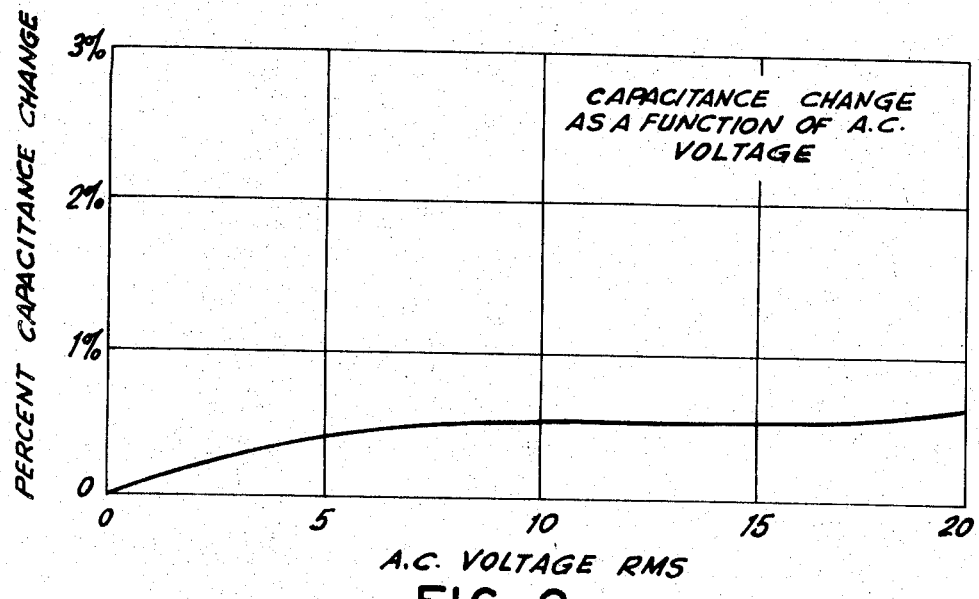
FIGS. 8 and 9 are graphs showing, respectively, change in capacitance and dissipation factor with change in A.C. voltage.

Likewise, referring to FIG. 8, the percent capacitance change as a function of AC voltage RMS (Root Mean Square) is maintained over a narrow range of 0 to 0.6% over a voltage range to 0 to 20 volts as compared to the prior platinum capacitor which exhibited a change of about 0 to 8% for voltages ranging up to about 15 volts.

Figure 9:
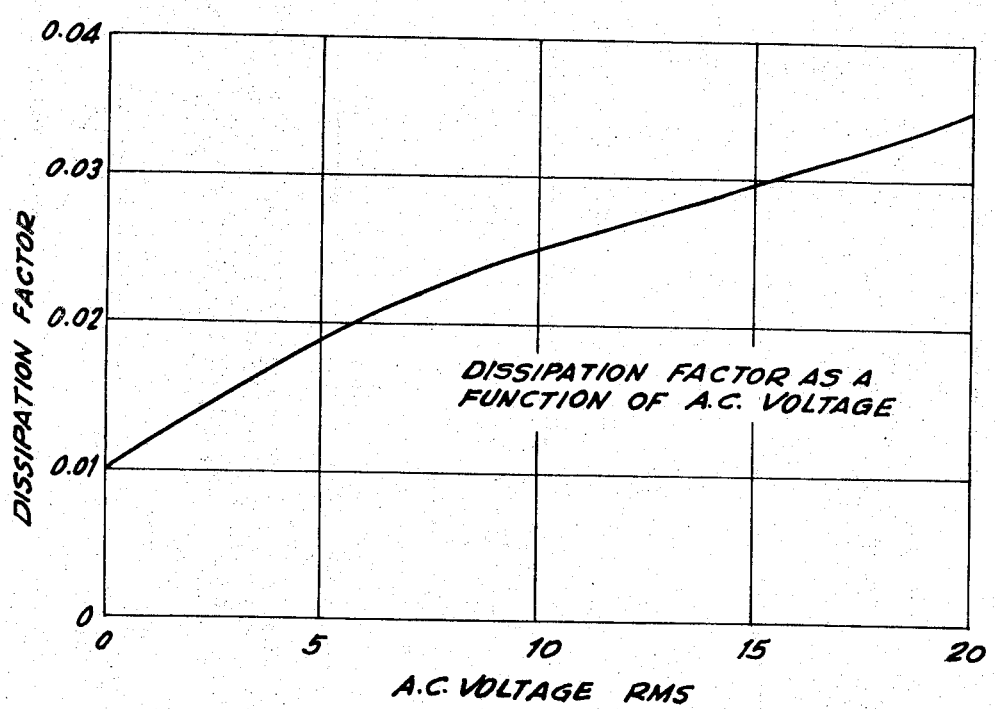

The dissipation factor as a function of voltage (0 to 20 volts) is shown by FIG. 9 to range from about 0.01 to about 0.035, the platinum electrode capacitor by comparison exhibiting a dissipation factor of about 0.01 to 0.035 for up to 12 volts.

Figure 5:
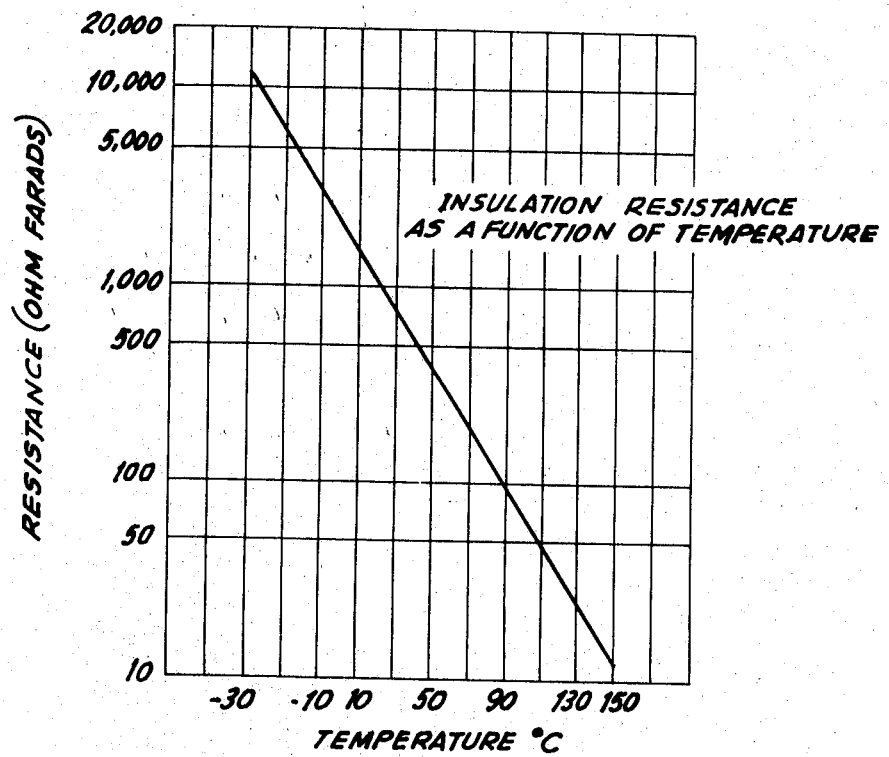
FIG. 5 is a graph depicting change of insulation resistance with change in temperature.
Figure 10:
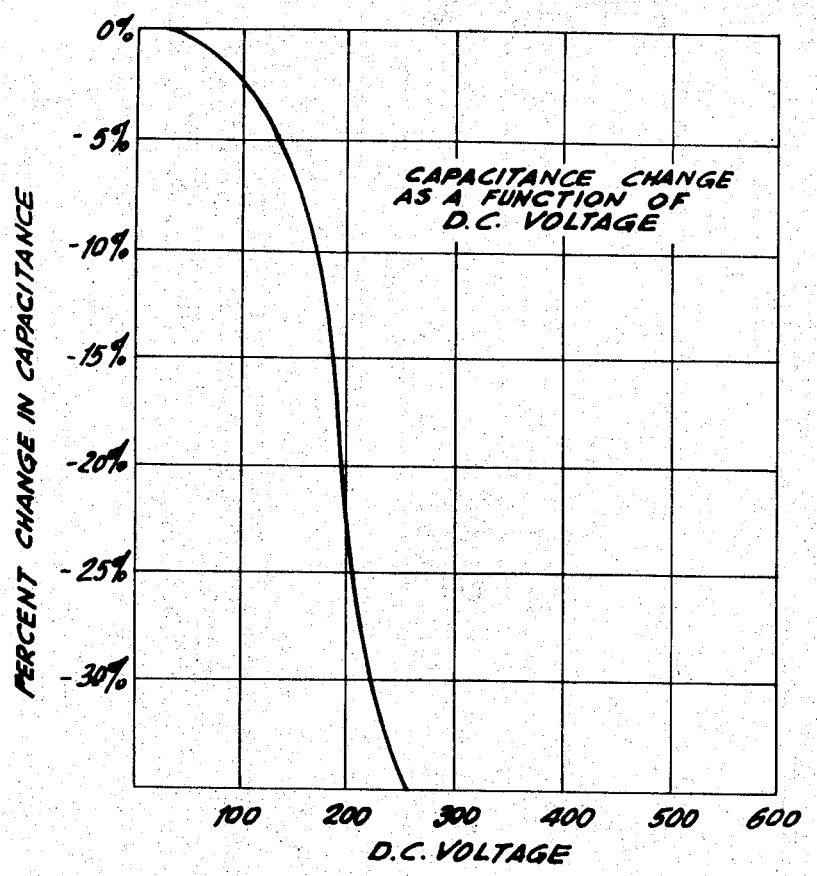
FIG. 10 is a graph depicting percent change in capacitance with change in D.C. voltage.

Further properties of the novel capacitor of the invention are illustrated in FIGS. 5 and 10.

Examples of other compositions of the modified dielectric falling within the ranges disclosed hereinbefore are as follows:

| Example | Percentages | | | |
|---|---|---|---|---|
| | $BaTiO_3$ | $MnO_2$ | $Fe_2O_3$ | $CeO_2$ |
| 1 | 72 | 25.0 | 2 | 1 |
| 2 | 75 | 23 | 1.5 | 0.5 |
| 3 | 78 | 21.0 | 0.9 | 0.1 |

Alloys of the metals nickel, cobalt and iron that may be used as electrode material in addition to the individual metals are: 52% Ni=48% Fe, 80% Ni=20% Fe, 50% Ni=50% Co, 50% Co=50% Fe, 80% Ni=20% Co, 34% Ni=33% Co=33% Fe, and the like.

As stated hereinabove, in producing capacitors in accordance with the invention, I find it advantageous to conduct the high temperature firing in an inert atmosphere, such as nitrogen. While I prefer to use a sintering temperature of about 1300° C., the temperature may range from about 1280° C. to as high as 1400° C.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. As an article of manufacture, a base metal electrode capacitor comprising a plurality of layers of a ceramic composition fired together, said layers of ceramic having interleaved therebetween films of a base metal electrode selected from the group consisting of nickel, cobalt, iron, and alloys thereof, alternate films of said metal electrode being electrically coupled together, the composition of said ceramic consisting essentially by weight of about 15% to 25% $MnO_2$, about 0.5% to 2% $Fe_2O_3$, about 0.1% to 1% $CeO_2$ and the balance essentially at least about 72% $BaTiO_3$.

2. The article of manufacture of claim 1, wherein the electrode metal is nickel and wherein the ceramic consists essentially by weight of about 18% to 20% $MnO_2$, about 0.5% to 1% $Fe_2O_3$, about 0.1% to 0.5% $CeO_2$ and the balance essentially at least about 78% by weight of $BaTiO_3$.

3. The article of manufacture of claim 2, wherein the ceramic consists essentially of approximately 79% $BaTiO_3$, approximately 19.8% $MnO_2$, approximately 1% $Fe_2O_3$ and approximately 0.2% $CeO_2$.

References Cited

UNITED STATES PATENTS 2,750,657   6/1956   Herbeat _____ 29—25.42

ELLIOTT A. GOLDBERG, Primary Examiner

U.S. Cl. X.R.

106—39; 252—63.2